United States Patent
Sakamoto et al.

(10) Patent No.: US 6,835,796 B2
(45) Date of Patent: Dec. 28, 2004

(54) OPTICAL FILM AND METHOD OF PRODUCING THE SAME, OPTICAL ELEMENT, AND IMAGE DISPLAY DEVICE

(75) Inventors: Michie Sakamoto, Ibaraki (JP); Amane Mochizuki, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 84 days.

(21) Appl. No.: 10/285,683

(22) Filed: Nov. 1, 2002

(65) Prior Publication Data

US 2003/0125503 A1 Jul. 3, 2003

(30) Foreign Application Priority Data

| Nov. 2, 2001 | (JP) | ........................ 2001-338164 |
| Feb. 12, 2002 | (JP) | ........................ 2002-033897 |
| Sep. 2, 2002 | (JP) | ........................ 2002-256886 |

(51) Int. Cl.$^7$ .................. C08G 14/00; C08G 10/00
(52) U.S. Cl. ............... 528/125; 528/220; 528/451; 528/397; 428/421; 428/524; 427/372.2
(58) Field of Search ............... 528/125, 220, 528/401, 347; 428/421, 524; 427/372.2

(56) References Cited

U.S. PATENT DOCUMENTS

| 5,344,916 A | 9/1994 | Harris et al. |
| 5,480,964 A | 1/1996 | Harris et al. |
| 5,580,950 A | 12/1996 | Harris et al. |
| 6,238,753 B1 | 5/2001 | Ezzell et al. |

FOREIGN PATENT DOCUMENTS

| JP | 2000-190385 | 7/2000 |

OTHER PUBLICATIONS

Kimura et al., Synthesis of novel fluorine containing poly(aryl ether ketone)s, 2000, Chem Abstract 134: 147940.*

* cited by examiner

Primary Examiner—Duc Truong
(74) Attorney, Agent, or Firm—Westerman, Hattori, Daniels & Adrian LLP

(57) ABSTRACT

An optical film containing polyaryletherketone and a method of producing the optical film, the optical film being excellent in the heat resistance and uniformity, and the film having a negative birefringence. The optical film compensates birefringence of a liquid crystal display, thereby providing an optical element or an image display device that has desired color tones and viewing-angle characteristics. The optical film having a negative birefringence of 0.001 to 0.6 is produced by coating a solution containing polyaryletherketone on a substrate and subsequently drying the coating.

17 Claims, No Drawings

OPTICAL FILM AND METHOD OF PRODUCING THE SAME, OPTICAL ELEMENT, AND IMAGE DISPLAY DEVICE

BACKGROUND OF THE INVENTION

1. Field of the Invention

The present invention relates to an optical film that has an optically negative uniaxiality and that is suitably used in various applications for optical films, a method of producing the optical film, an optical element or an image display device including the optical film.

2. Description of the Related Art

Liquid crystal displays (LCDs) such as STN (Super Twisted Nematic)-LCDs and TFT (Thin Film Transistor)-LCDs have considerable merits e.g., they are thin, light-weighted, driven at a low voltage, and power-saving. For this reason, such LCDs are used widely for high-quality displays that replace cathode-ray tubes, and the displays are used for portable electronic equipment such as portable TVs, digital cameras, and video cameras; as well as laptop personal computers, and computer monitors. In general, many of these liquid crystal displays include birefringent optical films made of polymer materials or liquid crystal materials in order to solve problems such as display coloring caused by birefringence of liquid crystal cells, deterioration in contrast, and deterioration in the viewing-angle characteristics.

Some birefringent optical films that are being produced or under development have uniaxial refractive indices. Such kinds of optical films are classified further into films having in-plane optical axes and films having out-of-plane optical axes (in the film normal directions). The films are classified still further depending on whether the axes are positive or negative. A typical example of the films having the optical axes in the in-plane of the film is an optical film used for color compensation in a STN-LCD. The optical film for color compensation is obtained generally by stretching a polymer film, and it presents an optically positive uniaxiality.

An example of optical films having the out-of-plane optical axes is an optical film of polyimide presenting an optically negative uniaxiality (hereinafter may be described as 'having a negative birefringence'), which is proposed by Harris et al. and Ezzell et al (see, for example, U.S. Pat. Nos. 5,344,916, 5,480,964, 5,580,950, and 6,238,753). Such a film can be produced, for example, by coating a polymer solution on a proper substrate so as to plane-orient the polymer. The thus produced film can be used for an optical film for improving a visual angle of a TFT-LCD.

SUMMARY OF THE INVENTION

An object of the present invention is to provide an optical film having excellent heat resistance, high uniformity, and a negative refractive index. Furthermore, by compensating birefringence of a liquid crystal display, the present invention provides an optical element having good color tones and viewing-angle characteristics. In addition, the present invention provides image display devices such as liquid crystal displays and organic EL display devices using the optical elements.

For achieving the above-described objects, the present invention provides an optical film containing polyaryletherketone and having a negative birefringence. Such an optical film is excellent in the heat resistance and uniformity, and has a negative birefringence. It is preferable in the film that the negative birefringence is in a range of 0.001 to 0.6.

It is also preferable in the optical film that the polyaryletherketone is a polyaryletherketone having at least one fluorine atom in a repeating structural unit of its main chain.

It is also preferable that the polyaryletherketone has a repeating structural unit represented by a formula (1):

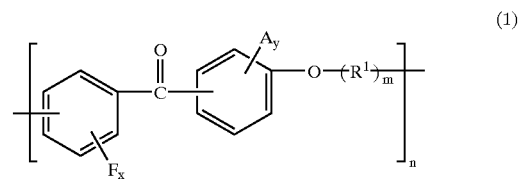

where F denotes a fluorine atom; A denotes a halogen atom, a lower alkyl group or a lower alkoxy group; x and y denote integers from 0 to 4; m denotes 0 or 1; n represents a polymerization degree; and $R^1$ denotes a group represented by a formula (2):

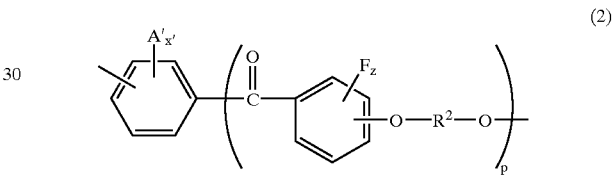

where F denotes a fluorine atom; A' denotes a halogen atom, a lower alkyl group or a lower alkoxy group; z and x' denote integers from 0 to 4; p denotes 0 or 1; and $R^2$ denotes a divalent aromatic group. The polymerization degree n is, for example, from 40 to 1000, preferably from 50 to 900, and more preferably from 70 to 800.

It is particularly preferable that the polyaryletherketone has a repeating structural unit represented by a formula (3):

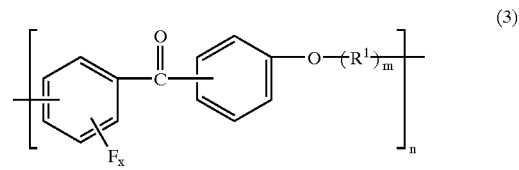

where F denotes a fluorine atom; x denotes an integer from 0 to 4; m denotes 0 or 1; n represents a polymerization degree; and $R^1$ denotes a group represented by the formula (2):

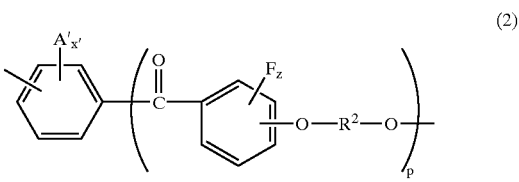

where F denotes a fluorine atom; A' denotes a halogen atom, a lower alkyl group or a lower alkoxy group; z and x' denote integers from 0 to 4; p denotes 0 or 1; and $R^2$ denotes a divalent aromatic group. The polymerization degree n is, for example, from 40 to 1000, preferably from 50 to 900, and more preferably from 70 to 800.

When the polyaryletherketone has a repeating structural unit represented by either the formula (1) or (3), the $R^1$ in any of the formulas can be a group represented by a formula (4):

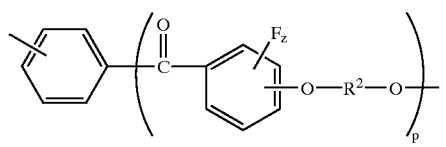
(4)

where F denotes a fluorine atom; z denotes an integer from 0 to 4; and p denotes 0 or 1; $R^2$ denotes a divalent aromatic group.

It is preferable in the formulas (2) and (4) that the divalent aromatic group ($R^2$) is at least one kind of the groups represented by formulas (5):

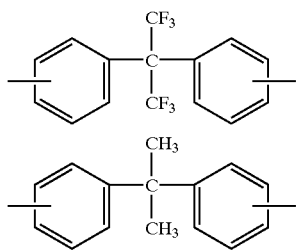
(5)

-continued

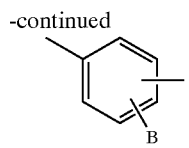

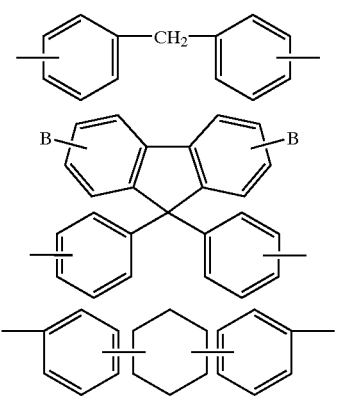

where B denotes a halogen atom, a hydrogen atom, a lower alkyl group having 1–4 carbons or a lower alkoxy group having 1–4 carbons.

A specific example of the above-described polyaryletherketone can have a repeating structural unit represented by a formula (6), (7), (8) or (9). The polymerization degree n is, for example, from 40 to 1000, preferably from 50 to 900, and more preferably from 70 to 800.

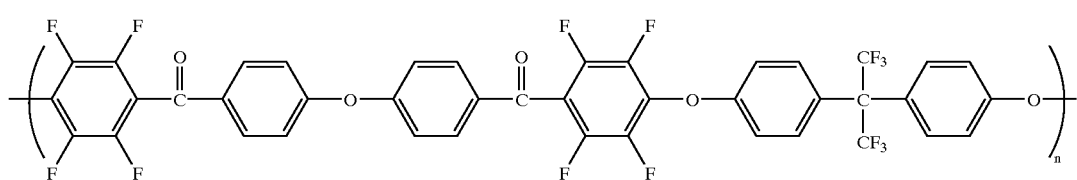
(6)

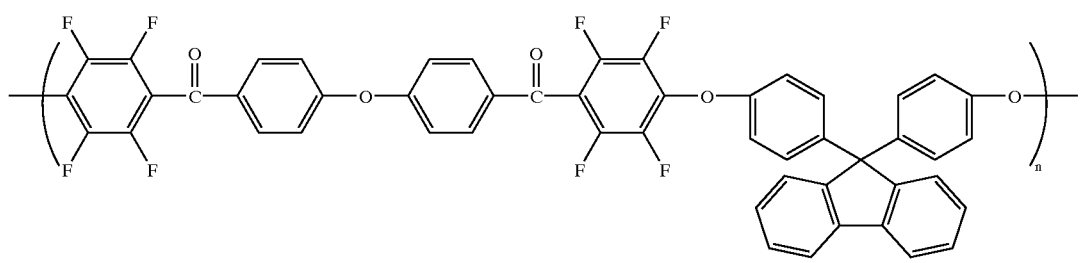
(7)

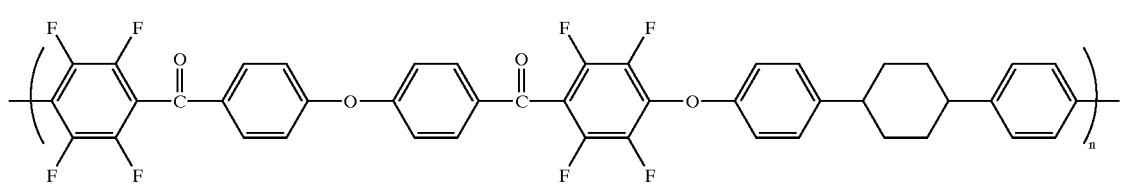
(8)

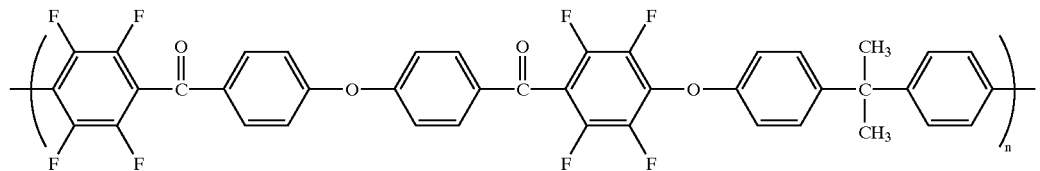

(9)

Next, a method of producing an optical film according to the present invention includes a step of coating a solution containing polyaryletherketone on a substrate and a step of drying the coated solution. Accordingly, the method can provide an optical film where the refractive index distribution easily can be controlled, and which has high uniformity and a negative birefringence.

Furthermore, a viewing-angle compensating member according to the present invention includes the above-described optical film.

An optical element according to the present invention includes the above-described optical film. The optical element may include at least one additional optical film, and the optical film according to the present invention may be laminated on at least one surface of the additional optical film.

Furthermore, an image display device according to the present invention includes the above-described optical film, the viewing-angle compensating member or the optical element.

DETAILED DESCRIPTION OF THE INVENTION

The optical film according to present invention contains polyaryletherketone, and is a negative uniaxial film having an out-of-plane optical axis. Such a film has its optical axis in the z-axis direction, where nx and ny (principal indices of refraction) are substantially equal and nz (a principal index of refraction) is smaller than nx and ny. The film can be called also a negative C film.

In the present invention, nx, ny and nz respectively denote principal indices of refraction of x-, y- and z-directions. The x-direction and the y-direction denote film in-plane directions perpendicular to each other, and z-direction denotes a film thickness direction. The values of the principal indices of reflection nx, ny and nz are determined substantially depending on the structure of the applied polyaryletherketone, film thickness, film production conditions or the like. Therefore, a retardation value in the thickness direction, i.e., a key parameter from an aspect of the optical characteristics, can be controlled properly by adjusting the materials, the film thickness and the production conditions. The retardation value denotes a value obtained from a product of a film thickness (d) and a difference (Δn) between the refractive index in the thickness direction and the refractive index in the in-plane direction, i.e., nx-nz (or ny-nz). The optical film according to the present invention has a negative birefringence Δn, for example, in a range of 0.001 to 0.6, preferably of 0.002 to 0.6, and more preferably, of 0.004 to 0.6. When the refractive index is 0.001 or more, for example, there is no need to increase the film thickness for obtaining a desired retardation value in the thickness direction. As a result, there is no need to take the film thickness into consideration at the time of attaching the film to a liquid crystal display or the like. When the difference in the refractive indices is 0.6 or less, the film thickness can be controlled further easily to obtain a desired retardation value.

Though there is no specific limitation about the retardation value in the thickness direction, i.e., a value provided by Δn×d (film thickness), it is generally from 10 nm to 2000 nm, preferably from 30 nm to 1000 nm, and more preferably from 30 nm to 500 nm. A retardation value of at least 10 nm may secure sufficient functions for an optical film. The retardation value of at most 2000 nm sufficiently may avoid unevenness that may be generated during formation of a coating film or drying the film. As a result, sufficient uniformity in the retardation value in the film thickness direction can be secured.

The optical film according to the present invention has a thickness of, for example, from 0.1 μm to 500 μm, preferably from 0.3 μm to 200 μm, and more preferably, from 0.5 μm to 100 μm. When the film thickness is 0.1 μm or more, the retardation value can be secured sufficiently as described above, thereby securing excellent functions for an optical film. When the film thickness is 500 μm or less, the film thickness can have sufficient uniformity.

The optical films having the above-described optical parameters are formed from polyaryletherketone. A typical polyaryletherketone may be formed into an optical film having high heat resistance due to its transparency and high glass transition point. Polyaryletherketones for the present invention have an ether group (—O—) and a ketone group (—C(=O)—) in the repeating unit, and the groups are connected with an aryl group. The polyaryletherketones can be represented by the following formula (1):

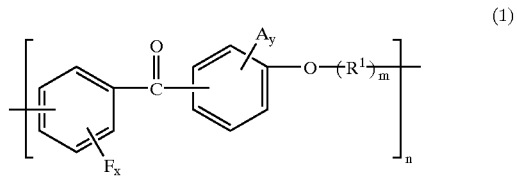

(1)

where F denotes a fluorine atom; A denotes a halogen atom, a lower alkyl group or a lower alkoxy group; x and y denote integers from 0 to 4; m denotes 0 or 1; n represents a polymerization degree; and $R^1$ denotes a group represented by a formula (2):

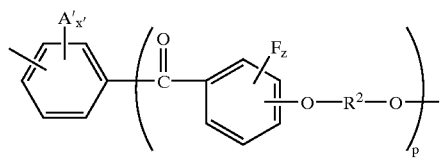
(2)

where F denotes a fluorine atom; A' denotes a halogen atom, a lower alkyl group or a lower alkoxy group; z and x' denote integers from 0 to 4; p denotes 0 or 1; and $R^2$ denotes a divalent aromatic group.

It is preferable in the formula (1) that y=0, and more preferably, y=0 and x'=0. Such polyaryletherketones have a repeating structural unit represented by the formula (3), where $R^1$ is a group represented by the formula (4):

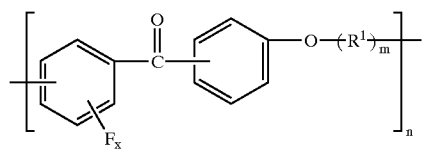
(3)

where F denotes a fluorine atom; x denotes an integer from 0 to 4; m denotes 0 or 1; n represents a polymerization degree; and $R^1$ denotes a group represented by the formula (4):

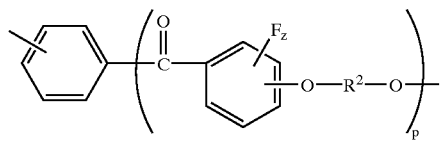
(4)

where F denotes a fluorine atom; z denotes an integer from 0 to 4; p denotes 0 or 1; and $R^2$ denotes a divalent aromatic group.

It is preferable in the formulas (2) and (4) that the divalent aromatic group ($R^2$) is at least one of the groups represented by the following formulas (5):

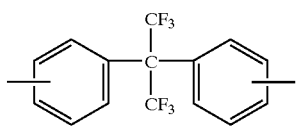
(5)

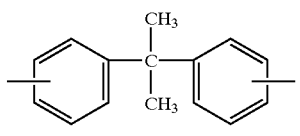

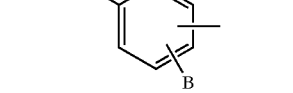

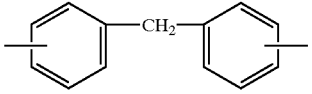

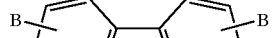

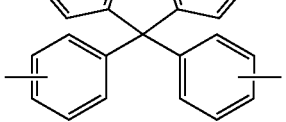

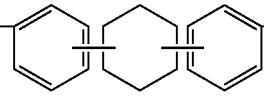

where B denotes a halogen atom, a hydrogen atom, a lower alkyl group having 1–4 carbons or a lower alkoxy group having 1–4 carbons.

Specific examples of such preferred polyaryletherketones include the ones represented by the following formulas (6), (7), (8), and (9).

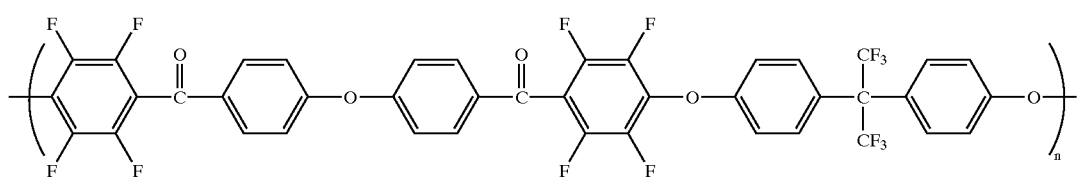
(6)

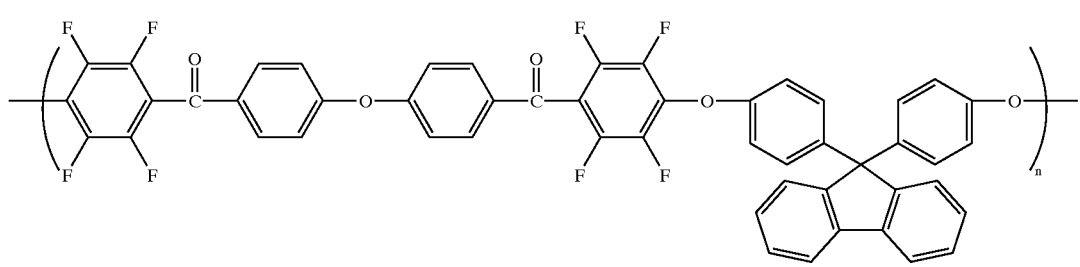
(7)

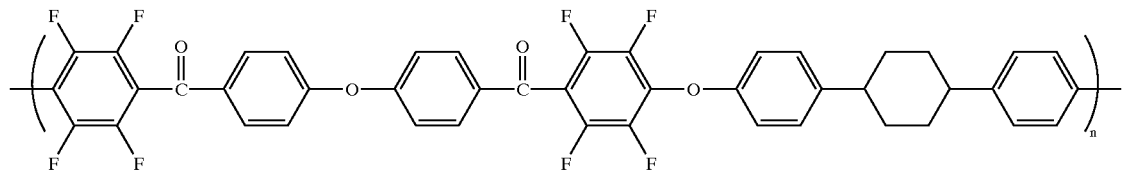

(8)

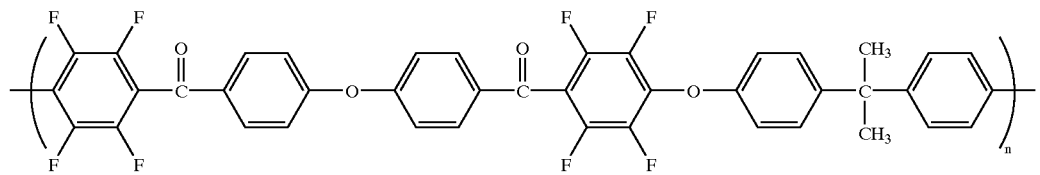

(9)

The optical film according to the present invention may contain one of the above described polyaryletherketones, or a blend of at least two kinds of these polyaryletherketones. Alternatively, the polyaryletherketone can have at least two kinds of the repeating units. Furthermore, any additional resin can be blended as long as the properties of the polyaryletherketone will be maintained. Examples of the additional resin include polyethersulfone, polyether, polyimide, polyamide, polyester, polyamideimide, polyetherimide, polycarbodiimide, polyolefin, and polyetherketone having a different composition.

The optical film according to the present invention can be produced, for example, by coating a solution prepared by dissolving the polyaryletherketone in a solvent onto a substrate, and drying the coated solution. There is no specific limitation about the solvent as long as it can dissolve the polyaryletherketone, and the examples of suitable solvents include: halogenated hydrocarbons such as chloroform, dichloromethane, carbon tetrachloride, dichloroethane, tetrachloroethane, trichloroethane, tetrachloroethylene, chlorobenzene, and orthodichlorobenzene; phenols such as phenol, p-chlorophenol, o-chlorophenol, m-cresol, o-cresol, and p-cresol; aromatic hydrocarbons such as benzene, toluene, xylene, methoxybenzene, and 1,2-dimethoxybenzene; solvents based on ketones such as acetone, methylethylketone, methylisobutylketone, cyclohexanone, cyclopentanone, 2-pyrrolidone, and N-methyl-2-pyrrolidone; solvents based on esters such as ethyl acetate and butyl acetate; solvents based on alcohols such as t-butyl alcohol, glycerol, ethylene glycol, triethylene glycol, ethylene glycol monomethyl ether, diethylene glycol dimethyl ether, propylene glycol, dipropylene glycol, and 2-metyl-2,4-pentanediol; solvents based on amides such as dimethylformamide, and dimethylacetoamide; solvents based on nitriles such as acetonitrile and butyronitrile; solvents based on ethers such as diethyl ether, dibutyl ether, tetrahydrofuran, and dioxane; carbon disulfide; ethylcellosolve; and butylcellosolve. The solvent can be used alone, or it can be mixed with at least one of the other solvents.

The concentration of the polyaryletherketone in the solution is typically from 0.5 wt % to 50 wt %, preferably from 1 wt % to 40 wt %, and more preferably from 2 wt % to 30 wt %. The polyaryletherketone solution further can contain one or more additives such as a surfactant, a plasticizer, an ultraviolet absorber, an antioxidant, a dyestuff, a pigment, an adherence improver, and a filler, as long as the effects of the invention will not be deteriorated.

The substrate on which the polyaryletherketone-containing solution is coated is not limited specifically limited as long as the optical film obtained as a final product presents an optically negative uniaxiality. Specific examples of suitable substances include a glass substrate, a plastic substrate such as a plastic film, and a metal substrate such as a stainless steel belt, a stainless steel drum, and a copper foil. The plastic substrate, the stainless steel belt and the stainless steel drum are preferred, particularly from an aspect of cladding with the following described polarizing plate. Alternatively, the solution can be coated directly on the polarizing plate.

The above-described plastic film substrate can be formed from, for example, a polyolefin such as polyethylene, polypropylene and poly(4-methylpentene-1); polyimide, polyamideimide, polyamide, polyetherimide, polyether ether ketone, polyketone sulfide, polyether sulfone, polysulfone, polyphenylene sulfide, polyphenylene oxide, polyphenylene terephthalate, polybutylene terephthalate, polyphenylene naphthalate, polyacetal, polycarbonate, polyalylate, acrylic resin, polyvinyl alcohol, polypropylene, cellulose-based plastic, epoxy resin, and phenol resin. The plastic film can be optically isotropic or anisotropic. Films formed of, for example, polypropylene, polyethylene terephthalate and polyphenylene naphthalate are preferred, particularly from an aspect of the resistance to solvents and heat. The plastic film typically has a thickness of at least 10 $\mu$m. When the thickness is 10 $\mu$m or more, the film can have a strength sufficient for a substrate, thereby preventing problems such as rupture at the time of production.

There is no specific limitation about the method of coating the polyaryletherketone on the substrate, but any technique known in the field can be used. Specific examples thereof include spin coating, roll coating, printing, immersion, curtain coating, wire-bar coating, a doctor blade method, knife coating, tie coating, gravure coating, micro-gravure coating, offset gravure coating, lip coating, and spray coating. Any of the coating methods can be used to coat the polyaryletherketone solution onto a substrate so that the solution is formed as a film having the desired thickness, and then drying the formed film so as to obtain the optical film of the present invention.

Conditions for drying are not limited specifically, but they are properly selected depending on factors such as kinds of the polyaryletherketone and the solvent. As specific examples, the drying temperature may be generally from 40°

C. to 400° C., preferably from 50° C. to 300° C., and more preferably from 60° C. to 200° C. The coating may be dried at a fixed temperature. Alternatively, the temperature may be increased or decreased gradually during the drying step. Though the time for the drying is not limited specifically, it is in general from 10 seconds to 30 minutes, preferably from 30 seconds to 25 minutes, and more preferably from 1 minute to 20 minutes.

The optical film obtained in the above-described steps is peeled off from the substrate if the film can support itself, and thus it can be used by itself for various purposes. A film which is not supportive may be used with the substrate when the substrate is transparent. Alternatively, the optical film can be transferred from the substrate to another substrate (hereinafter, referred to as 'a second substrate') for use. The transfer of the film may be carried out by, for example, adhering the optical film formed on the substrate with the second substrate through an adhesive or a pressure-sensitive adhesive, and then peeling the original substrate from the film surface.

There is no specific limitation about the second substrate used for the transfer as long as it has a flat surface. Specifically, for example, transparent glass sheets and plastic films are preferred. The transparent plastic film may be made of, e.g., polymethyl methacrylate, polystyrene, polycarbonate, polyethersulfone, polyphenylene sulfide, polyalylate, polyethylene terephthalate, polyethylene naphthalate, polyolefin, triacetylcellulose, norbornene-based resin, and epoxy resin. Preferably, the second substrate is optically isotropic, but it can be optically anisotropic depending on the use of the optical film. Examples of the second substrate having optical anisotropy include a retardation film prepared by stretching the plastic film. Alternatively, the second substrate may be, for example, a liquid crystal film with a fixed liquid crystal orientation, a light-diffusion film, a diffraction film or a polarizing film.

The optical film according to the present invention may be used alone or combined as required with an additional optical film to form a laminated body for various optical uses, for example, optical compensating members of various liquid crystal elements. Examples of the additional optical films include a retardation film having a different refractive index, a liquid crystal film, a light-diffusion film, a diffraction film, and a polarizing film. Alternatively, the optical film of the present invention may be combined with iodine-based or dyestuff-based polarizing films that are produced industrially. Specifically the additional optical film can be laminated on at least one surface of the polarizing film so as to provide a polarizing plate having a function of compensating and adjusting the birefringence of a liquid crystal display element. When the optical film of the present invention is laminated on one surface of a polarizing film, an ordinary protective film can be laminated on the other surface of the polarizing film. Examples of liquid crystal elements include a STN (Super Twisted Nematic) cell, a TN (Twisted Nematic) cell, an IPS (In-Plane Switching) cell, a VA (Vertical Aligned) cell, an OCB (Optically Aligned Birefringence) cell, a HAN (Hybrid Aligned Nematic) cell, an ASM (Axially Symmetric Aligned Microcell) cell, a ferroelectric cell, and an antiferroelectric cell. The cells may be subjected to an orientation-division systematically or randomly. The liquid crystal display to be assembled with the optical film of the present invention may be driven in any of a simple matrix method, an active matrix method using a TFT (Thin Film Transistor) electrode or a TFD (Thin Film Diode) electrode, or a plasma-address method.

One example of the optical element according to the present invention is a laminate prepared by disposing the optical film of the present invention on at least one surface of another optical film such as a retardation film having a different refractive index, a liquid crystal film, a light-diffusion film, a diffraction film, and a polarizing film. Alternatively, the optical element can be produced by further laminating an additional optical layer on a polarizing plate. Though there is no specific limitation, the optical layer may be selected from any known optical layers such as a reflector, a transflecter, and a retardation plate (including a half/quarter wavelength plate). The optical layers can be used alone or laminated with at least one of the remaining layers. It is particularly preferable that the polarizing plate is further laminated with an additional reflector or transflecter to form a reflective polarizing plate or a semitransparent polarizing plate, laminated with a retardation plate to form an elliptically polarizing plate or a circularly polarizing plate, or the polarizing plate can be laminated with a brightness-enhancement film.

The optical element can be treated further to have various characteristics and functions such as excoriation resistance, durability, weather resistance, resistance to humidity and heat, heat resistance, moisture resistance, moisture permeability, antistatic property, electroconductivity, improved interlayer adherence, and improved mechanical strength. Alternatively, functional layers can be inserted or laminated.

A typical reflective polarizing plate is prepared by providing a reflecting layer on a polarizing plate. It can be used for forming a liquid crystal display (reflective liquid crystal display) that reflects incident light from the visible side (display side). A reflective polarizing plate has some merits in that, for example, assembling of light sources such as backlight can be omitted, and the liquid crystal display can be thinned further. The reflective polarizing plate can be formed in a suitable manner such as by attaching a reflecting layer of metal or the like on one surface of the polarizing plate. For example, a transparent protective film is prepared by matting one of the surfaces, if required, and on this surface, a foil comprising a reflective metal such as aluminum or a deposition film is applied to form a reflecting layer.

Alternatively, a reflector can be used such as a reflecting sheet formed by providing a reflecting layer onto a suitable film similar to the transparent protective film. Since a typical reflecting layer of a reflector is made of a metal, it is preferably used in a state that the reflecting surface is coated with a film, a polarizing plate or the like in order to prevent a reduction of the reflection ratio due to oxidation. As a result, the initial reflection ratio is maintained for a long period, and a separate protective layer can be omitted.

A semitransparent polarizing plate is provided by, for example, disposing on a polarizing plate a semitransparent reflecting layer such as a half mirror that reflects and transmits light. In general, such a semitransparent polarizing plate is arranged on the backside of a liquid crystal cell. In a liquid crystal display comprising the semitransparent polarizing plate, incident light from the visible side (display side) is reflected to display an image when a liquid crystal display is used in a relatively bright atmosphere, while in a relatively dark atmosphere, an image is displayed by using a built-in light source such as a backlight on the backside of the semitransparent polarizing plate. In other words, the semitransparent polarizing plate may be used to form a liquid crystal display that can save energy for a light source such as a backlight under a bright atmosphere, while a built-in light source can be used under a relatively dark atmosphere.

The following description is about either an elliptically polarizing plate or a circularly polarizing plate which are formed by further laminating a retardation plate on the above-described polarizing plate.

The retardation plate is used for modifying linearly polarized light to either elliptically polarized light or circularly polarized light, modifying either elliptically polarized light or circularly polarized light to linearly polarized light, or modifying a polarization direction of linearly polarized light. For example, a retardation plate called a quarter wavelength plate (λ/4 plate) is used for modifying linearly polarized light to either elliptically polarized light or circularly polarized light, and for modifying either elliptically polarized light or circularly polarized light to linearly polarized light. A half wavelength plate (λ/2 plate) is used in general for modifying a polarization direction of linearly polarized light.

The above-described elliptically polarizing plate is effective in compensating (preventing) colors (blue or yellow) generated due to birefringence in a liquid crystal layer of a super twist nematic (STN) liquid crystal display so as to provide a black-and-white display free of such colors. Controlling three-dimensional refractive index is preferred further since it can compensate (prevent) colors that will be observed when viewing a screen of the liquid crystal display from an oblique direction. A circularly polarizing plate is effective in adjusting color tones of an image of a reflective liquid crystal display that has a color image display device, and the polarizing plate serves to prevent reflection as well.

Specific examples of the retardation plates include birefringent films formed by stretching films composed of polymers; oriented films of liquid crystal polymers; and oriented layers of liquid crystal polymers which are supported by films. Examples of the polymers composing the birefringent films include polycarbonate, polyvinyl alcohol, polystyrene, polymethyl methacrylate, polyolefins such as polypropylene, polyalylate, polyamide, and polynorbornene. The retardation plate may have a phase difference corresponding to the intended use, such as compensation of colors generated by birefringence of the respective wavelength plates and the liquid crystal layer and compensation of the viewing angle, such as expansion of visual angles. Two or more retardation plates can be laminated for controlling the optical characteristics such as the phase difference.

The elliptically polarizing plate and the reflective elliptically polarizing plate are prepared in general by suitably combining either a polarizing plate or a reflective polarizing plate with a retardation plate. Such an elliptically polarizing plate can be formed by separately laminating a polarizing plate (reflective polarizing plate) and a retardation plate in a certain order in a process of manufacturing a liquid crystal display so as to combine a polarizing plate and a retardation plate. On the other hand, an optical film like the elliptically polarizing plate provides excellent stability in quality and operability in lamination, and thus it can improve efficiency in producing a liquid crystal display or the like.

A polarizing plate produced by bonding the above-described polarizing plate and a brightness enhancement film is arranged generally on the backside of a liquid crystal cell in use. When natural light enters, by reflection from a backlight or a backside of a liquid crystal display etc., the brightness enhancement film reflects linearly polarized light of a predetermined polarizing axis or circularly polarized light in a predetermined direction while the same film transmits other light. It allows entrance of light from a light source such as a backlight so as to obtain transmitted light in a predetermined polarization state, while reflecting light other than light in the predetermined polarization state. Light that is reflected at this brightness enhancement film is reversed through a reflecting layer or the like arranged additionally behind the brightness enhancement film. The reversed light that re-enters the brightness enhancement plate is transmitted partly or entirely as light in a predetermined polarization state, so that light transmitting the brightness enhancement film is increased and polarized light that is hardly absorbed in the polarizing film is supplied. As a result, the quantity of light available for the liquid crystal display etc. can be increased to enhance brightness. When light enters through a polarizing film from the backside of a liquid crystal cell by using a backlight or the like without using any brightness enhancement films, most light is absorbed in the polarizing film but is not transmitted by the polarizing film if the light has a polarization direction inconsistent with the polarization axis of the polarizing film. Depending on characteristics of the polarizing film, about 50% of the light is absorbed in the polarizing film, and this decreases the quantity of light available in the liquid crystal display or the like and makes the image dark. The brightness enhancement film repeatedly prevents light having a polarization direction to be absorbed in the polarizing film from entering the polarizing film, and reflects the light on the brightness enhancement film, reverses the light through a reflecting layer or the like arranged behind, and makes the light re-enter the brightness enhancement plate. Since the polarized light that is reflected and reversed between them is transmitted only if the light has a polarization direction to pass the polarizing film, light from a backlight or the like can be used efficiently for displaying images of a liquid crystal display in order to provide a bright screen.

Suitable examples of the brightness enhancement film include a multilayer thin film of a dielectric or a multilayer lamination of thin films with varied refraction aeolotropy that transmits linearly polarized light having a predetermined polarization axis while reflecting other light. Alternatively, a cholesteric liquid crystal layer, more specifically, an oriented film of a cholesteric liquid crystal polymer or an oriented liquid crystal layer fixed onto a film substrate, which reflects either clockwise or counterclockwise circularly polarized light while transmitting other light may be used.

Therefore, for a brightness enhancement film to transmit linearly polarized light having a predetermined polarization axis, the transmission light enters the polarizing plate by matching the polarization axis so that absorption loss due to the polarizing plate is controlled and the light can be transmitted efficiently. For a brightness enhancement film to transmit circularly polarized light, i.e., a cholesteric liquid crystal layer, it is preferable that the circularly polarized light is converted into a linearly polarized light before entering the polarizing plate from an aspect of suppressing the absorption loss, though the circularly polarized light can enter the polarizer, without being subjected to such conversion. For example, use of a quarter wavelength plate for the retardation plate can serve to convert circularly polarized light into linearly polarized light.

A retardation plate having a function as a quarter wavelength plate in a wide wave range including a visible light region may be obtained, for example, by overlapping a retardation layer functioning as a quarter wavelength plate for monochromatic light such as light having 550 nm wavelength and another retardation plate showing a separate optical retardation property (e.g., a retardation plate functioning as a half wavelength plate). Therefore, a retardation plate arranged between a polarizing plate and a brightness enhancement film can comprise a single layer or at least two layers of retardation layers. A cholesteric liquid crystal layer can also be provided by combining layers different in reflection wavelength and it may be configured by overlapping at least two layers. As a result, the obtained retardation plate can reflect circularly polarized light in a wide wavelength range including a visible light region, and this can provide transmission of circularly polarized light in a wide wavelength range.

A polarizing plate according to the present invention may be made by laminating a polarizing plate and at least two optical layers. In other words, the polarizing plate can be a reflective polarizing plate or a semitransparent polarizing plate for elliptically polarized light, which is prepared by combining either the above-mentioned reflective polarizing plate or a semitransparent polarizing plate with a retardation plate.

Lamination of a viewing-angle compensating member on the optical film and furthermore, lamination of respective optical layers on the polarizing plate, may be carried out by a method of laminating layers separately in a certain order for manufacturing a liquid crystal display etc. When these elements are laminated previously, the stability in quality and operability in assembly can be improved, and thus efficiency in producing a liquid crystal display can be improved. Any proper adhesion means such as a pressure-sensitive adhesive may be used for the lamination. In adhesion of the polarizing plate and any other optical films, for example, the optical axes can have proper disposition angles corresponding to the desired phase difference characteristics or the like.

When a light-diffusion sheet is provided on at least one surface of the polarizing plate or an optical element such as an optical film provided with at least one polarizing plate, a pressure-sensitive adhesive layer or the like may be provided on the opposite surface for providing adhesion to another member such as a liquid crystal cell. Though there is no specific limitation, the pressure-sensitive adhesive used for forming the pressure-sensitive adhesive layer may be selected suitably from polymers such as acrylic polymers, silicone-based polymers, or polymers containing base polymers such as polyester, polyurethane, polyamide, polyether, fluororesins and rubbers. An acrylic pressure-sensitive adhesive is particularly preferable, since such an adhesive is excellent in the optical transparency, and provides proper wettability, cohesiveness, adhesiveness (pressure-sensitive adhesiveness), and excellent light resistance and heat resistance.

Particularly, pressure-sensitive adhesive layers having a low moisture absorption coefficient and an excellent heat resistance are preferred from the aspect of prevention of foaming or peeling caused by moisture absorption, or prevention of decrease in the optical characteristics and warping of a liquid crystal cell caused by difference in thermal expansion coefficients. As a result, a high quality liquid crystal display having excellent durability can be produced.

The pressure-sensitive adhesive layer may contain known additives such as a filler including one or more of natural or synthetic resins (especially, sticky resins), glass fibers, glass beads, metal powder, or any other inorganic powders; a pigment; a coloring agent; and an antioxidant. The pressure-sensitive adhesive layer may contain fine particles to provide light-diffusion property.

The pressure-sensitive adhesive layers may be arranged on the polarizing plate or the optical element such as the optical film by a suitable method. For example, a solution comprising a pressure-sensitive adhesive of about 10–40 weight % is prepared by dissolving or dispersing a base polymer or the composition in a solvent comprising materials such as toluene, ethyl acetate or a mixture thereof. The solution is provided directly onto an optical element by any suitable methods such as casting or coating. Otherwise, a pressure-sensitive adhesive layer can be formed on a separator by the above-mentioned manner before being transferred onto the optical element. The pressure-sensitive adhesive layer may be a laminate of plural layers having different compositions. The thickness of the pressure-sensitive adhesive layer can be properly selected depending on the intended use, the adhesive force or the like, and in general it ranges from 1 $\mu$m to 500 $\mu$m in general, and preferably from 5 $\mu$m to 200 $\mu$m, and particularly preferably from 10 $\mu$m to 100 $\mu$m.

When the pressure-sensitive adhesive layer is exposed, it is preferable that the pressure-sensitive adhesive layer is covered with a separator by the time the pressure-sensitive adhesive layer is used so that contamination will be prevented. The separator may be a thin film selected properly without any specific limitations from, e.g., a plastic film, a rubber sheet, paper, cloth, a non-woven fabric, a net, a foamed sheet, a metal foil, and a laminate thereof by coating a peeling agent if required. The peeling agent may be selected, for example, from a silicone-based agent, a long-chain alkyl-based agent, a fluorine-based agent, an agent comprising molybdenum sulfide or the like.

The above-described members composing the polarizing plate and the optical element, such as a polarizing film, a transparent protective film, an optical layer and a pressure-sensitive adhesive layer, can have ultraviolet absorption ability as a result of treatment with an ultraviolet absorber such as an ester salicylate compound, a benzophenone compound, a benzotriazole compound, a cyanoacrylate compound, and a nickel complex salt compound.

The optical elements provided with the viewing-angle compensating members preferably are used for forming various display devices such as liquid crystal displays. The liquid crystal display may be formed in a conventional method. That is, the liquid crystal display may be formed in general by assembling components such as a liquid crystal cell and an optical element, and also an illuminating system as required, in a suitable manner and further assembling a driving circuit. There is no specific Imitation in the method as long as the optical film and optical element of the present invention are used. For the liquid crystal cell, any types of cells such as TN type, STN type and π type may be used arbitrarily.

The display device of the present invention may be a liquid crystal display prepared by disposing an optical element on at least one surface of the liquid crystal cell or by using either a backlight or a reflector in the illuminating system. In this case, the optical element may be disposed on at least one surface of the liquid crystal cell. Optical elements disposed on both the surfaces may be the same, or they may be varied. Moreover, for forming a liquid crystal display, one or more suitable members such as a diffusion plate, an antiglare layer, an antireflection film, a protective plate, a prism array sheet, a lens array sheet, an optical diffuser and a backlight can be arranged at proper positions.

An optical film, a viewing-angle compensating member and the optical element according to the present invention may be used for an organic electroluminescence apparatus as well as the liquid crystal display.

In general, an organic electroluminescence (organic EL) apparatus has a luminant (organic EL luminant) that is prepared by laminating a transparent electrode, an organic luminant layer and a metal electrode in a certain order on a transparent substrate. Here, the organic luminant layer is a laminated body of various organic thin films. Known examples thereof include a laminate of a hole injection layer made of triphenylamine or the like and a luminant layer made of a phosphorous organic solid such as anthracene; a laminate of the luminant layer and an electron injection layer made of perylene derivative or the like; or a laminate of the hole injection layer, the luminant layer and the electron injection layer.

In general, the organic EL apparatus emits light on the principle of a system of applying a voltage to the transparent electrode and the metal electrode so as to inject holes and electrons into the organic luminant layer, energy generated by the re-bonding of these holes and electrons excites the phosphor, and the excited phosphor emits light when it returns to the basis state. The mechanism of the re-bonding during the process is similar to that of an ordinary diode. This implies that current and the light emitting intensity exhibit a considerable nonlinearity accompanied with a rectification with respect to the applied voltage.

It is preferred for the organic EL apparatus that at least one of the electrodes is transparent so as to obtain luminescence at the organic luminant layer. In general, a transparent electrode of a transparent conductive material such as indium tin oxide (ITO) is used for the anode. Use of substances having small work function for the cathode is effective for facilitating the electron injection and thereby raising luminous efficiency, and in general, metal electrodes such as Mg—Ag, and Al—Li may be used.

In an organic EL apparatus configured as described above, the organic luminant layer is made of a film that is extremely thin such as about 10 nm. Therefore, the organic luminant layer can transmit substantially whole light as the transparent electrode does. As a result, when the layer does not illuminate, a light beam entering from the surface of the transparent substrate and passing through the transparent electrode and the organic luminant layer before being reflected at the metal layer comes out again to the surface of the transparent substrate. Thereby, the display surface of the organic EL apparatus looks like a mirror when viewed from exterior.

As mentioned above, a transparent electrode can be provided on the surface of the organic luminant layer that emits light by application of voltage. At the same time, in an organic EL apparatus including an organic EL luminant having a metal electrode on the backside of the organic luminant layer, for example, a polarizing plate can be provided on the surface of the transparent electrode and a retardation plate can be provided between the transparent electrode and the polarizing plate.

The retardation plate and the polarization plate function to polarize light which enters from outside and is reflected by the metal electrode, and thus the polarization has an effect that the mirror of the metal electrode cannot be viewed from exterior. Particularly, the mirror of the metal electrode can be blocked completely by forming the retardation plate with a quarter wavelength plate and adjusting an angle formed by the polarization direction of the retardation plate and the polarizing plate to be $\pi/4$.

That is, the polarizing plate transmits only the linearly polarized light constituent among the external light entering the organic EL apparatus. In general, the linearly polarized light is changed into elliptically polarized light by the retardation plate. When the retardation plate is a quarter wavelength plate and when the angle of the polarization direction provided by the polarizing plate and the retardation plate is $\pi/4$, the light is changed into circularly polarized light.

Generally, this circularly polarized light passes through the transparent substrate, the transparent electrode, and the organic thin film. After being reflected by the metal electrode, the light passes again through the organic thin film, the transparent electrode and the transparent substrate, and turns into linearly polarized light at the retardation plate. Moreover, since the linearly polarized light crosses the polarization direction of the polarizing plate at a right angle, it cannot pass through the polarizing plate. As a result, the mirror of the metal electrode can be blocked completely.

EXAMPLES

The present invention will be described below more specifically by referring to illustrative Examples, though the present invention is not restricted thereto. In the following Examples, '%' and 'part' mean 'weight %' and 'weight part' respectively except where specifically noted. Measurements used in the respective Examples are described immediately below.

Refractive Index Measurement

The refractive index at 590 nm was measured by using an automatic birefringence meter (KOBRA21ADH) manufactured by Oji Scientific Instruments.

Film Thickness Measurement

A digital micrometer K-351C manufactured by Anritsu Corporation was used for the measurement.

Glass Transition Point (Tg)

DSC 5200 manufactured by Seiko Instruments Inc. was used for the measurement in accordance with JIS-K7121.

Example 1

A 5% toluene solution of polyaryletherketone A represented by the formula (6) (manufactured by Nippon Shokubai Co., Ltd.) was added to isopropyl alcohol so as to reprecipitate the polyaryletherketone A. The thus obtained polyaryletherketone A was dissolved in toluene so as to prepare a 10% polymer solution. This polymer solution was spin-coated on a glass sheet and dried for 15 minutes at 100° C. so as to form a film on the glass substrate. For this film, the film thickness d and refractive indices (nx, ny, nz) of the in-plane and thickness directions were measured to calculate the birefringent value Δn and the retardation value (Δn·d) in the thickness direction. The results set forth in Table 1 indicate that the film has an optically negative uniaxiality with an out-of-plane optical axis. The film had Tg of 187° C. Moreover, the refractive index of the film did not change even after a treatment with heat at 60° C. for 168 hours, showing an excellent heat resistance.

The refractive index was measured while the film was laminated on a glass sheet. The refractive index of the glass sheet did not cause any substantial influences. The Tg was measured after peeling the film from the glass sheet.

Example 2

A 10% polymer solution was prepared by dissolving polyaryletherketone B (manufactured by Nippon Shokubai Co., Ltd.) represented by the formula (7) in toluene. This polymer solution was spin-coated on a glass sheet and dried at 100° C. for 15 minutes so as to form a film on the glass substrate. For this film, the film thickness d and refractive indices (nx, ny, nz) of the in-plane and thickness directions were measured to calculate the birefringent value Δn and the retardation value (Δn·d) in the thickness direction. The results set forth in Table 1 indicate that the film has an optically negative uniaxiality with an out-of-plane optical axis. The film had Tg of 240° C. Moreover, the refractive index of the film did not change even after a treatment with heat at 60° C. for 168 hours, showing an excellent heat resistance.

The refractive index was measured while the film was laminated on a glass sheet. The Tg was measured after peeling the film from the glass sheet.

Example 3

A 10% polymer solution was prepared by dissolving polyaryletherketone C (manufactured by Nippon Shokubai Co., Ltd.) represented by the formula (8) in toluene. This polymer solution was spin-coated on a glass sheet and dried at 100° C. for 15 minutes so as to form a film on the glass substrate. For this film, the film thickness d and refractive indices (nx, ny, nz) of the in-plane and thickness directions were measured to calculate the birefringent value Δn and the retardation value (Δn·d) in the thickness direction. The results set forth in Table 1 indicate that the film has an optically negative uniaxiality with an out-of-plane optical axis. The film had Tg of 182° C. showing an excellent heat resistance.

Example 4

A 10% polymer solution was prepared by dissolving polyaryletherketone D (manufactured by Nippon Shokubai Co., Ltd.) represented by the formula (9) in toluene. This polymer solution was spin-coated on a glass sheet and dried at 100° C. for 15 minutes so as to form a film on the glass substrate. For this film, the film thickness d and refractive indices (nx, ny, nz) of the in-plane and thickness directions were measured to calculate the birefringent value Δn and the retardation value (Δn·d) in the thickness direction. The results set forth in Table 1 indicate that the film has an optically negative uniaxiality with an out-of-plane optical axis. The film had Tg of 180° C., showing an excellent heat resistance.

TABLE 1

|  | Example 1 | Example 2 | Example 3 | Example 4 |
| --- | --- | --- | --- | --- |
| Nx | 1.55307 | 1.55176 | 1.60960 | 1.61343 |
| Ny | 1.55295 | 1.55152 | 1.60948 | 1.61327 |
| Nz | 1.53198 | 1.53472 | 1.59742 | 1.59129 |
| Δn | 0.0210 | 0.0169 | 0.0121 | 0.0221 |
| Film thickness d (μm) | 3.3 | 2.0 | 7.0 | 5.2 |
| Δn · d | 68.4 | 33.7 | 85.3 | 115.1 |

Example 5

A film of polyaryletherketone A was formed on a substrate in the same manner of the Example 1 except that the substrate was a polyethylene terephthalate (PET) film having a thickness of 75 μm. By using an acrylic adhesive, the film on the PET substrate was bonded to a triacetylcellulose (TAC) film of 80 μm in thickness and being optically isotropic, and then the PET substrate was removed. The thus obtained laminate contained a film of polyaryletherketone A, an adhesive layer and the TAC layer laminated in this order.

Example 6

A film of polyaryletherketone B was formed on a substrate in the same manner of the Example 2 except that the substrate was a polyethylene terephthalate (PET) film having a thickness of 75 μm. By using an acrylic adhesive, the film on the PET substrate was bonded to a triacetylcellulose (TAC) film of 80 μm in thickness and being optically isotropic, and then the PET substrate was removed. The thus obtained laminate contained a film of polyaryletherketone B, an adhesive layer and the TAC layer laminated in this order.

As described above, the optical film according to the present invention contains polyaryletherketone and exhibits negative uniaxiality with its out-of-plane optical axis. This film can be applied to various uses such as a viewing-angle compensating member and a retardation film, and thus, it is considerably effective from the aspect of industrial usage.

The method of producing optical films according to the present invention facilitates production of the films and control of the refractive indices. The films have excellent heat resistance and high uniformity. Moreover, since an optical element containing such an optical film can compensate the birefringence of a liquid crystal cell, and thus, an image device including the optical film can have improved performance.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, all changes that come within the meaning and range of equivalency of the claims are intended to be embraced therein.

What is claimed is:

1. An optical film containing polyaryletherketone, the optical film having a negative birefringence.

2. The optical film according to claim 1, wherein the negative birefringence is in a range of 0.001 to 0.6.

3. The optical film according to claim 1, wherein the polyaryletherketone is a polyaryletherketone having at least one fluorine atom in a repeating structural unit of its main chain.

4. The optical film according to claim 1, wherein the polyaryletherketone has a repeating structural unit represented by a formula (1):

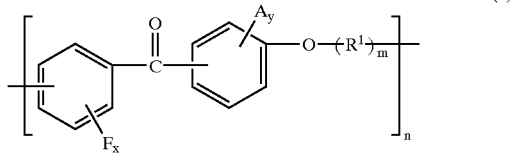

(1)

where F denotes a fluorine atom; A denotes a halogen atom, a lower alkyl group or a lower alkoxy group; x and y denote integers from 0 to 4; m denotes 0 or 1; n represents a polymerization degree; and $R^1$ denotes a group represented by a formula (2):

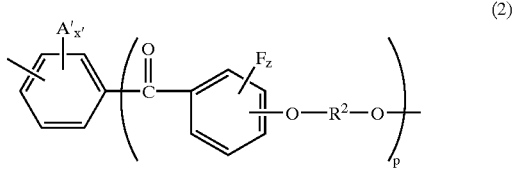

(2)

where F denotes a fluorine atom; A' denotes a halogen atom, a lower alkyl group or a lower alkoxy group; z and x' denote integers from 0 to 4; p denotes 0 or 1; and $R^2$ denotes a divalent aromatic group.

5. The optical film according to claim 1, wherein the polyaryletherketone has a repeating structural unit represented by a formula (3):

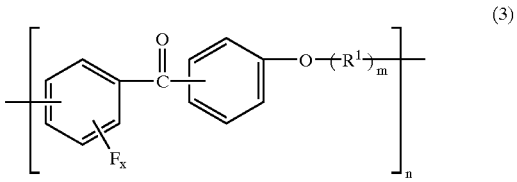

(3)

where F denotes a fluorine atom; x denotes an integer from 0 to 4; m denotes 0 or 1; n represents a polymerization degree; and $R^1$ denotes a group represented by the formula (2):

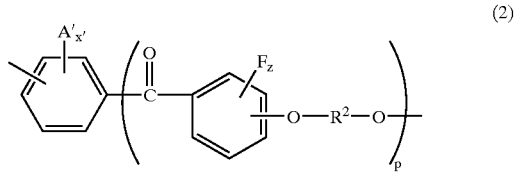

(2)

where F denotes a fluorine atom; A' denotes a halogen atom, a lower alkyl group or a lower alkoxy group; z and x' denote integers from 0 to 4; p denotes 0 or 1; and $R^2$ denotes a divalent aromatic group.

6. The optical film according to claim 1, wherein $R^1$ in the formulas (1) and (3) is a group represented by a formula (4):

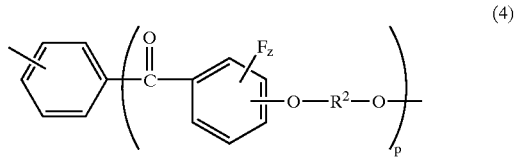

(4)

where F denotes a fluorine atom; z denotes an integer from 0 to 4; and p denotes 0 or 1; $R^2$ denotes a divalent aromatic group.

7. The optical film according to claim 4, wherein the divalent aromatic group ($R^2$) in any of the formulas (2) and (4) is at least one of groups represented by formulas (5):

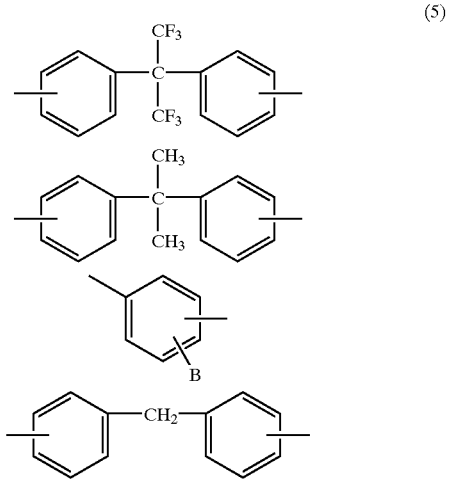

(5)

-continued

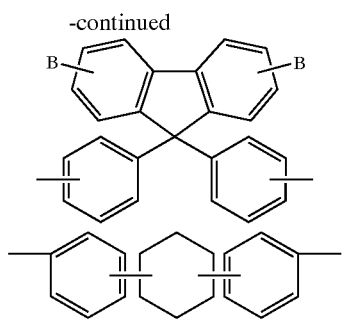

where B denotes a halogen atom, a hydrogen atom, a lower alkyl group having 1–4 carbons or a lower alkoxy group having 1–4 carbons.

8. The optical film according to claim 1, wherein the polyaryletherketone has a repeating structural unit represented by a formula (6):

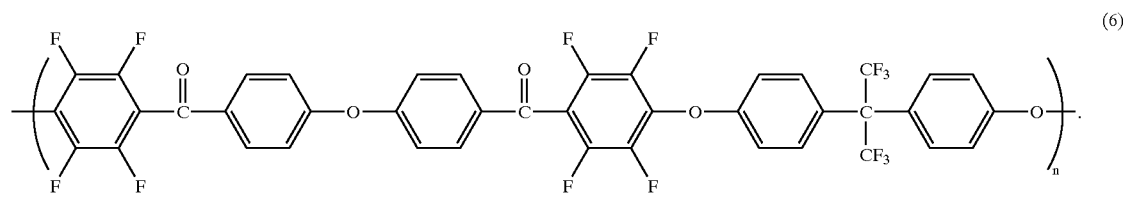

(6)

9. The optical film according to claim 1, wherein the polyaryletherketone has a repeating structural unit represented by a formula (7):

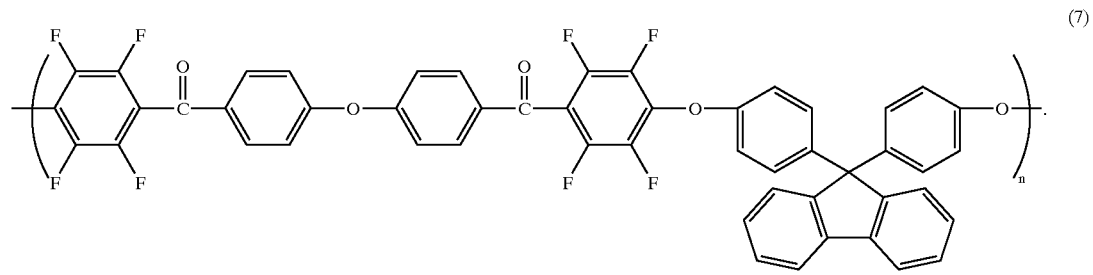

(7)

10. The optical film according to claim 1, wherein the polyaryletherketone has a repeating structural unit represented by a formula (8):

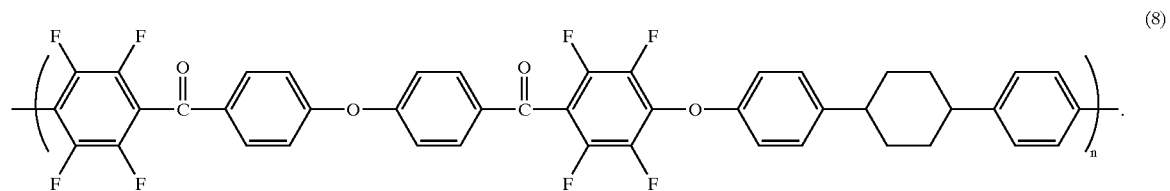

(8)

11. The optical film according to claim 1, wherein the polyaryletherketone has a repeating structural unit represented by a formula (9):

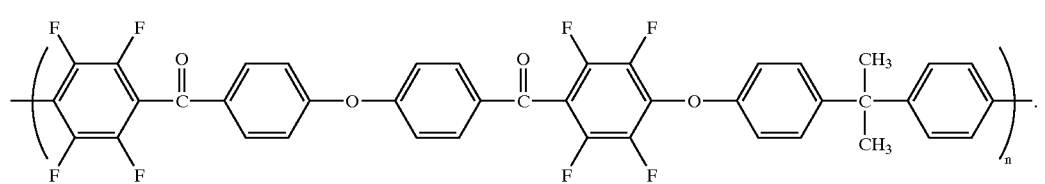

(9)

12. A method of producing the optical film according to claim 1, the method comprises coating a solution containing polyaryletherketone on a substrate and drying the coated solution.

13. A viewing-angle-compensating member comprising the optical film according to claim 1.

14. An optical element comprising the optical film according to claim 1.

15. The optical element according to claim 14, wherein the optical element further comprises an additional optical film, and the optical film is laminated on at least one surface of the additional optical film.

16. An image display device comprising: the viewing-angle compensating member according to claim 13.

17. An image display device comprising the optical element according to claim 14.

* * * * *